United States Patent
Baldwin

(10) Patent No.: US 7,246,536 B2
(45) Date of Patent: Jul. 24, 2007

(54) DUAL CLUTCH KINEMATIC ARRANGEMENTS WITH WIDE SPAN

(75) Inventor: Reid Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 208 days.

(21) Appl. No.: 11/083,250

(22) Filed: Mar. 17, 2005

(65) Prior Publication Data

US 2006/0207365 A1 Sep. 21, 2006

(51) Int. Cl.
F16H 3/093 (2006.01)

(52) U.S. Cl. .......................... 74/340; 74/331

(58) Field of Classification Search .............. 74/330, 74/331, 339, 340
See application file for complete search history.

(56) References Cited

U.S. PATENT DOCUMENTS

| 4,461,188 | A | 7/1984 | Fisher |
| 5,761,961 | A * | 6/1998 | Krauss et al. ............ 74/333 |
| 5,823,051 | A | 10/1998 | Hall, III |
| 5,974,905 | A | 11/1999 | Hedman |
| 6,021,684 | A | 2/2000 | Alfredsson |
| 6,244,123 | B1 | 6/2001 | Hegerath et al. |
| 6,755,089 | B2 | 6/2004 | Hirt |
| 6,766,705 | B1 | 7/2004 | Hall, III |
| 6,958,028 | B2 * | 10/2005 | Janson et al. ............ 475/207 |
| 2003/0154810 | A1 | 8/2003 | Hedman |

* cited by examiner

Primary Examiner—Sherry Estremsky
Assistant Examiner—Edwin A Young
(74) Attorney, Agent, or Firm—David B. Kelley

(57) ABSTRACT

A multiple speed power transmission is disclosed having an input, first and second input shafts, first and second clutches releasably coupling the input to the first and second input shafts, respectively, and a set of selectable power paths connecting the first and second input shafts to the output, the set of selectable power paths having at least one power path that includes both the first and second input shafts.

28 Claims, 9 Drawing Sheets

| Gear Number | Number of teeth |
|---|---|
| 30 | 17 |
| 32 | 17 |
| 34 | 87 |
| 38 | 45 |
| 40 | 29 |
| 42 | 37 |
| 44 | 41 |
| 46 | 31 |
| 48 | 32 |
| 50 | 34 |
| 52 | 18 |
| 54 | 25 |
| 56 | 41 |
| 58 | 33 |

Fig 2

| Gear | Coupler 60 | Coupler 62 | Coupler 64 | Clutch | Speed Ratio | Step Size |
|---|---|---|---|---|---|---|
| 1st | 46 | 42 |  | 16 | 17.97 |  |
|  |  |  |  |  |  | 1.70 |
| 2nd |  | 42 |  | 20 | 10.56 |  |
|  |  |  |  |  |  | 1.60 |
| 3rd |  |  | 56 | 16 | 6.58 |  |
|  |  |  |  |  |  | 1.50 |
| 4th |  | 40 |  | 20 | 4.38 |  |
|  |  |  |  |  |  | 1.40 |
| 5th | 44 |  |  | 16 | 3.13 |  |
| Reverse | 46 |  | 58 | 16 | -16.03 |  |

Fig 3

| Gear Number | Number of teeth |
|---|---|
| 30 | 21 |
| 32 | 25 |
| 34 | 92 |
| 70 | 61 |
| 72 | 43 |
| 74 | 51 |
| 76 | 24 |
| 78 | 67 |
| 80 | 36 |
| 82 | 41 |
| 84 | 26 |
| 86 | 71 |
| 88 | 54 |
| 90 | 43 |
| 92 | 51 |

Fig 5

| Gear | Coupler 94 | Coupler 96 | Coupler 98 | Coupler 100 | Clutch | Speed Ratio | Step Size |
|---|---|---|---|---|---|---|---|
| 1st |  | 74 | 86 |  | 20 | 17.88 |  |
|  |  |  |  |  |  |  | 1.64 |
| 2nd |  |  | 86 |  | 16 | 10.89 |  |
|  |  |  |  |  |  |  | 1.51 |
| 3rd |  |  |  | 92 | 20 | 7.22 |  |
|  |  |  |  |  |  |  | 1.38 |
| 4th | 72 |  |  |  | 16 | 5.23 |  |
|  |  |  |  |  |  |  | 1.36 |
| 5th |  |  |  | 90 | 20 | 3.86 |  |
|  |  |  |  |  |  |  | 1.30 |
| 6th |  |  | 88 |  | 16 | 2.97 |  |
|  |  |  |  |  |  |  | 1.26 |
| 7th |  | 74 |  | 90 | 16 | 2.35 |  |
| R1 | 70 | 74 |  |  | 20 | -18.29 |  |
|  |  |  |  |  |  |  | 1.64 |
| R2 | 70 |  |  |  | 16 | -11.13 |  |

Fig 6

| Gear Number | Number of teeth |
|---|---|
| 30 | 29 |
| 32 | 29 |
| 34 | 40 |
| 102 | 34 |
| 104 | 29 |
| 106 | 39 |
| 108 | 30 |
| 110 | 37 |
| 112 | 52 |
| 114 | 45 |
| 116 | 19 |
| 118 | 41 |
| 120 | 44 |
| 122 | 36 |

Fig 8

| Gear | Coupler 124 | Coupler 126 | Coupler 128 | Coupler 130 | Clutch | Speed Ratio | Step Size |
|---|---|---|---|---|---|---|---|
| 1st | 106 | | 110 | | 16 | 4.67 | |
| | | | | | | | 1.65 |
| 2nd | 106 | | | | 20 | 2.84 | |
| | | | | | | | 1.50 |
| 3rd | | 108 | | | 16 | 1.89 | |
| | | | | | | | 1.40 |
| 4th | | | | 120 | 20 | 1.35 | |
| | | | | | | | 1.35 |
| 5th | | 34 | | | 16 | 1.00 | |
| | | | | | | | 1.30 |
| 6th | 104 | | | | 20 | 0.77 | |
| | | | | | | | 1.27 |
| 7th | | 34 | 110 | | 20 | 0.61 | |
| R1 | | | 110 | 122 | 16 | -4.31 | |
| | | | | | | | 1.65 |
| R2 | | | | 122 | 20 | -2.62 | |

Fig 9

DUAL CLUTCH KINEMATIC ARRANGEMENTS WITH WIDE SPAN

FIELD OF THE INVENTION

This invention relates to automatic transmissions having a layshaft kinematic arrangement, particularly to automatic transmissions having dual input clutches, but no torque converter.

BACKGROUND OF THE INVENTION

Automatic transmissions for transmitting power between an input and an output, either over a continuously variable range of speed ratios or in discrete step changes among speed ratios, have associated with them several sources of parasitic losses, which adversely affect fuel economy. These losses are associated with a torque converter, open hydraulic friction clutches and brakes, hydraulic pump, and gear meshes.

To improve fuel economy in a motor vehicle having an automatic transmission, an automated shift manual (ASM) transmission can be used to eliminate or substantially reduce all of these parasitic losses except gear mesh losses. An ASM transmission generally performs gear ratio changes by first interrupting torque transmitted from the engine to the transmission input, preparing the transmission components associated with the next speed ratio, and then restoring torque at the input. A primary functional feature of ASM transmissions is the need to interrupt power transmitted from the engine to the transmission input shaft before or during each gear ratio change.

Dual clutch layshaft transmissions are essentially two ASM transmissions, one providing odd numbered gears and one providing even numbered gears. Shifts between odd numbered gears and even numbered gears can be accomplished without interrupting power flow. While operating in an odd numbered gear, couplers can be actuated to configure the transmission for the next even numbered gear. Dual clutch transmissions have parasitic losses only slightly higher than ASM transmissions.

When a motor vehicle is accelerated from rest, the mechanical power generated by the engine exceeds the power utilized by the vehicle. The transmission must dissipate the difference, generally as heat. Open torque converters are very efficient at converting the excess mechanical power into heat in the working fluid. Friction clutches, as used in ASM and dual clutch transmissions, are limited in the rate at which they can dissipate the excess power. The amount of energy that must be dissipated is determined by the torque level, the speed difference across the clutch, and the duration of the event.

The most effective way to limit the power that must be dissipated by the clutch is to provide additional torque multiplication in the gearbox. This has two benefits. First, it reduces the torque which the clutch must transmit. Second, it reduces the duration of the event because the gearbox input will become equal to the engine speed at a lower vehicle speed. The need for similar top gear ratios, which is dictated by cruising fuel economy, is unchanged, so the resulting gearbox must have substantially more total span. The difference between adjacent gear ratios is limited by the ability to make comfortable shifts. As a result, it is also necessary to increase the number of discrete gear ratios.

Traditionally, one reverse ratio has been considered sufficient, since speed is relatively low and fuel efficiency in reverse is not a significant concern. However, if the gear multiplication is high enough to satisfy clutch thermal considerations, it may be excessive for normal reverse driving, even at those relatively low speeds. Therefore, it is beneficial to provide a reverse ratio similar to the traditional reverse ratio in addition to one that has much more multiplication.

One known way to increase the gear multiplication is to increase ratio of the tooth counts for individual gear pairs. This would require increasing the distance between shafts due to limitations on how small the gears can be relative to the shaft diameter. Adding an additional forward and reverse ratio would ordinarily require at least four additional gears and an additional synchronizer sleeve. The resulting transmission would be much larger and likely would not fit into the package space available.

SUMMARY OF THE INVENTION

To meet the needs of the industry and address the shortcomings of prior transmissions, the present invention provides a multiple speed power transmission having an input, first and second input shafts, first and second clutches releasably coupling the input to the first and second input shafts, respectively, and a set of selectable power paths connecting the first and second input shafts to the output, said set of selectable power paths including at least one power path which includes both the first and second input shafts.

A transmission according to this invention may be configured similarly to a dual clutch transmission with modest span. However, a selectable torque path between the two input shafts is added such that, when this path is activated, the input shaft associated with even gears rotates slower than the input shaft associated with odd gears by a pre-determined ratio. This torque path requires a new synchronizer, but may re-use gearing that was already present. Depending on the layout of an original gearbox, it is often possible to combine this new synchronizer with an existing synchronizer to form a three position sleeve (connecting a shaft to either of two gears or neither).

First gear is engaged by activating the new synchronizer in combination with the second gear synchronizer and the odd gear clutch. If the existing reverse ratio is driven by the even gear input shaft, then an extra low reverse ratio is also created. This low reverse is engaged by activating the new synchronizer in combination with the reverse synchronizer and the odd gear clutch. In fact, there is an additional ratio created below every even numbered ratio in the original transmission. However, only the ratios below first and reverse provide utility.

In a similar manner, new ratios are created above each odd numbered ratio. These ratios are engaged by activating the new synchronizer in combination with the corresponding odd gear synchronizer and the even gear clutch. Of these, only the ratio higher than the highest odd numbered ratio provides utility. For example, there would be a ratio available higher than the fifth gear ratio. The step size from fifth to this new ratio is the same as the step size between first and second, which is too large to utilize as sixth gear. However, if a traditional sixth gear is present, this new ratio is usable as a seventh gear. This new gear ratio utilizes the same clutch as sixth gear ratio, so the final upshift must be accomplished with a torque interruption like an ASM.

In total, a five forward speed single reverse gearbox with modest span can be transformed into a gearbox with seven forward speeds, two reverse speeds, and very large span. Similarly, a four forward speed single reverse gearbox with modest span can be transformed into a gearbox with five forward speeds, two reverse speeds, and very large span.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a chart containing a preferred number of teeth for each of the gears of the transaxle of FIG. 1;

FIG. 3 is a chart containing the speed ratios between the input and output and steps between the speed ratios for each of the forward and reverse speeds of the transaxle of FIG. 1, the gears having the number of teeth shown in FIG. 2;

FIG. 5 is a chart containing a preferred number of teeth for each of the gears of the transmission of FIG. 4;

FIG. 6 is a chart containing the speed ratios between the input and output and steps between the speed ratios for each of the forward and reverse speeds of the transmission of FIG. 4, the gears having the number of teeth shown in FIG. 5;

FIG. 8 is a chart containing a preferred number of teeth for each of the gears of the transmission of FIG. 7; and FIG. 9 is a chart containing the speed ratios between the input and output and steps between the speed ratios for each of the forward and reverse speeds of the transmission of FIG. 7, the gears having the number of teeth shown in FIG. 8.

DETAILED DESCRIPTION OF THE PREFERRED EMBODIMENTS

Figure 1:
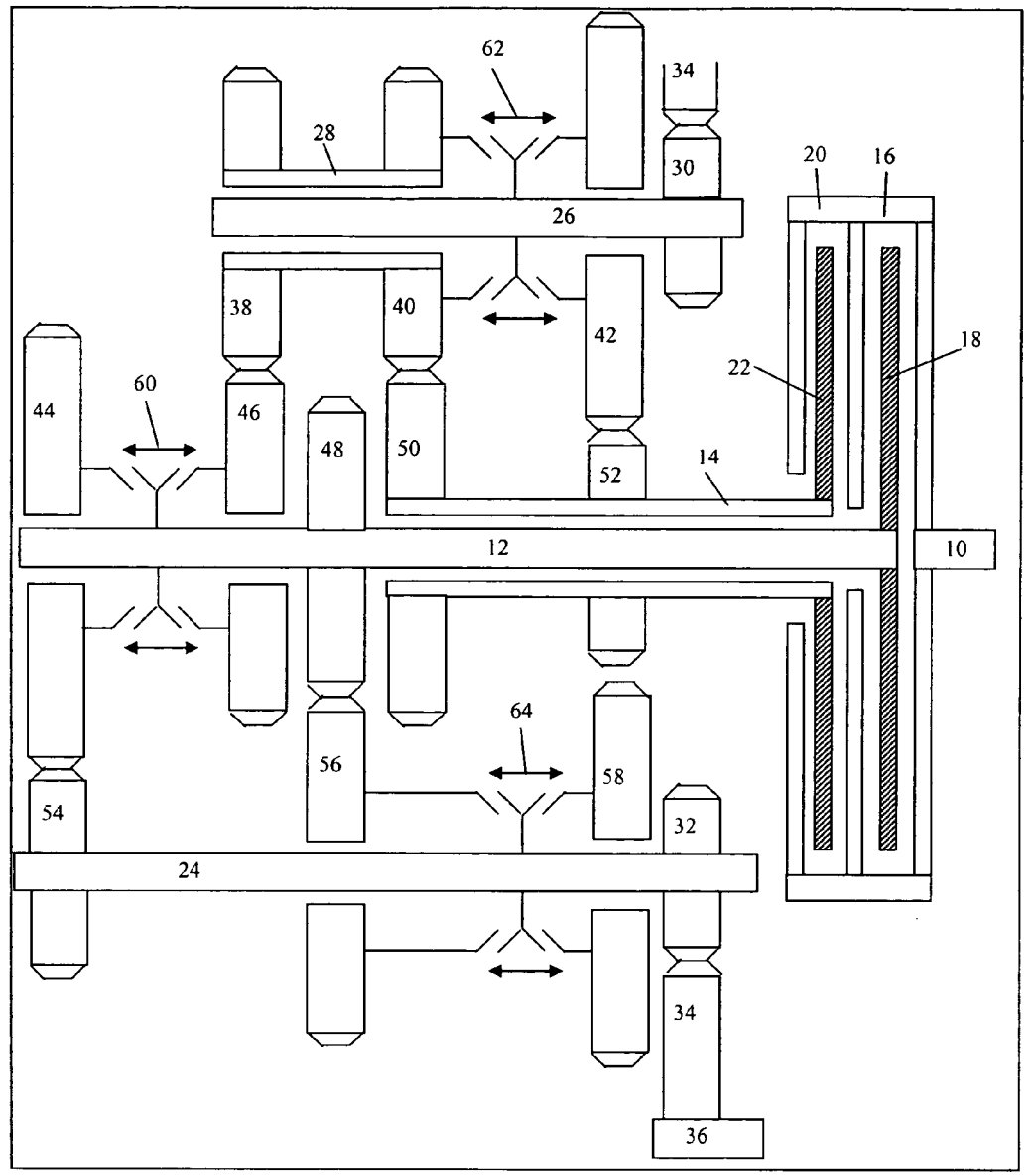
FIG. 1 is a schematic diagram showing of a five forward speed front wheel drive transaxle according to the present invention.

Referring to FIG. 1, a transaxle according to the present invention includes an input 10 for driveably connecting a power source, such as an internal combustion engine or electric motor, to the transmission, and an output 36 for driving a load, such as the driven wheels of a motor vehicle, through a powertrain that may include a drive shaft, differential mechanism, and axle shafts. A first friction clutch 20, consisting of a clutch housing and a clutch disc 22, alternately connects and disconnects a first input shaft 14 as clutch 20 is engaged and disengaged, respectively. A second friction clutch 16, consisting of a clutch housing and a clutch disc 18, connects and disconnects a second input shaft 12 as clutch 16 is engaged and disengaged, respectively.

A first layshaft 26 supports a first output pinion 30, which is secured to layshaft 26 in continuous meshing engagement with an output ring gear 34, secured to output 36. A second layshaft 24 supports a second output pinion 32, which is secured to the layshaft 24 in continuous meshing engagement with output ring gear 34.

The first input shaft 14 supports two pinions 50 and 52 which are secured to shaft 14. The second input shaft 12 supports one pinion 48 which is secured to shaft 12 and two pinions 44 and 46 which may rotate about shaft 12. Gear 42 is supported on layshaft 26 for rotation relative to layshaft 26, and in continuous meshing engagement with pinion 52.

Auxiliary shaft 28 is a hollow shaft supported on layshaft 26 for rotation relative to layshaft 26. The auxiliary shaft 28 supports gears 38 and 40 which are secured to shaft 28 and in continuous meshing engagement with pinions 46 and 50 respectively. Gear 54 is secured to layshaft 24 and in continuous meshing engagement with pinion 44. Gears 56 and 58 are supported on layshaft 24 for rotation relative to layshaft 24 and in continuous meshing engagement with pinion 48 and gear 42, respectively.

Couplers 60, 62, and 64 are preferably synchronizers of the type used in automotive manual transmissions to connect a gear or pinion to a shaft, after synchronizing the speed of the shaft and that of the pinion or gear. Each coupler may also disconnect the shaft and the associated pinion or gear. Alternatively, each coupler may be a dog clutch having teeth that are engaged with dog teeth on a gear or pinion. This invention may use couplers in any combination of synchronizers and dog clutches. Each coupler is composed of a hub secured to the shaft and a sleeve which is supported on the hub for sliding movement leftward or rightward into engagement with dog teeth on the adjacent gear or pinion. In the case where a coupler is a synchronizer, it is provided with a conical surface, which engages mutually with a corresponding conical surface located on the gear or pinion. When the synchronizer is engaging either of its adjacent gears, these conical surfaces are forced together into frictional contact, and that frictional engagement synchronizes the speed of the gear to that of the shaft before the dog teeth engage. Other types of sychronizers or couplers, now know or later invented, may also be used.

Coupler 60 connects second input shaft 12 to pinion 44, pinion 46, or disconnects it from both. Coupler 62 connects layshaft 26 to gear 40, gear 42, or disconnects it from both. Coupler 64 connects layshaft 24 to gear 56, gear 58, or disconnects it from both.

Engaging coupler 60 to pinion 46 activates a power path between the first and second input shaft comprising pinion 50, gear 40, auxiliary shaft 28, gear 38, pinion 46, and coupler 60.

To accelerate the vehicle using the first forward speed, the transmission is configured with coupler 60 engaging pinion 46 and coupler 62 engaging gear 42. Then, clutch 16 is engaged. The power path for this speed comprises input 10, clutch 16, input shaft 12, coupler 60, pinion 46, gear 38, auxiliary shaft 28, gear 40, pinion 50, input shaft 14, pinion 52, gear 42, coupler 62, layshaft 26, output pinion 30, output gear 34, and output 36. Input 10 is driveably connected to shaft 12 through clutch 16. Shaft 12 is driveably connected to pinion 46 through coupler 60. Pinion 46 drives gear 38, auxiliary shaft 28, gear 40, pinion 50, shaft 14, pinion 52, and gear 42. Gear 42 is driveably connected to layshaft 26 through coupler 62. Pinion 30 is secured to layshaft 26 and drives ring gear 34 and output 36.

To shift from the first forward speed to the second forward speed, clutch 20 is progressively engaged while clutch 16 is progressively released. Following the shift, coupler 60 may be moved to the neutral position, but in any event must be moved to the neutral position before the next odd-to-even upshift. The power path for this speed comprises input 10, clutch 20, input shaft 14, pinion 52, gear 42, coupler 62, layshaft 26, output pinion 30, output gear 34, and output 36. Input 10 is driveably connected to shaft 14 and pinion 52 through clutch 20. Pinion 52 drives gear 42, which is driveably connected to shaft 26 through coupler 62. Pinion 30 is secured to shaft 26 and drives ring gear 34 and output 36.

To shift from the second forward speed to the third forward speed, the transmission is configured by displacing coupler 64 to engage gear 56, then clutch 16 is progressively engaged while clutch 20 is progressively released. Following the shift, coupler 62 may be moved to the neutral position. The power path for this speed comprises input 10, clutch 16, input shaft 12, pinion 48, gear 56, coupler 64, layshaft 24, output pinion 32, output gear 34, and output 36. Input 10 is driveably connected to shaft 12 and pinion 48 through clutch 16. Pinion 48 drives gear 56, which is driveably connected to shaft 24 through coupler 64. Pinion 32 is secured to shaft 24 and drives ring gear 34 and output 36.

To shift from the third forward speed to the fourth forward speed, the transmission is configured by displacing coupler 62 to engage gear 40, then clutch 20 is progressively engaged while clutch 16 is progressively released. Following the shift, coupler 64 may be moved to the neutral position. The power path for this speed comprises input 10, clutch 20, input shaft 14, pinion 50, gear 40, coupler 62, layshaft 26, output pinion 30, output gear 34, and output 36. Input 10 is driveably connected to shaft 14 and pinion 50 through clutch 20. Pinion 50 drives gear 40, which is driveably connected to shaft 26 through coupler 62. Pinion 30 is secured to shaft 26 and drives ring gear 34 and output 36.

To shift from the fourth forward speed to the fifth forward speed, the transmission is configured by displacing coupler 60 to engage pinion 44, then clutch 16 is progressively engaged while clutch 20 is progressively released. Following the shift, coupler 62 may be moved to the neutral position. The power path for this speed comprises input 10, clutch 16, input shaft 12, coupler 60, pinion 44, gear 54, layshaft 24, output pinion 32, output gear 34, and output 36. Input 10 is driveably connected to shaft 12 through clutch 16. Shaft 12 is driveably connected to pinion 44 through coupler 60. Pinion 44 drives gear 54, shaft 24, pinion 30, ring gear 34, and output 36.

Downshifts are accomplished by reversing the steps of the corresponding upshift.

To accelerate the vehicle in reverse, the transmission is configured with coupler 60 engaging pinion 46 and coupler 64 engaging gear 58. Then, clutch 16 is engaged. The power path for this speed comprises input 10, clutch 16, input shaft 12, coupler 60, pinion 46, gear 38, auxiliary shaft 28, gear 40, pinion 50, input shaft 14, pinion 52, gear 42, gear 58, coupler 64, layshaft 24, output pinion 32, output gear 34, and output 36. Input 10 is driveably connected to shaft 12 through clutch 16. Shaft 12 is driveably connected to pinion 46 through coupler 60. Pinion 46 drives gear 38, auxiliary shaft 28, gear 40, pinion 50, shaft 14, pinion 52, gear 42, and gear 58. Gear 58 is driveably connected to layshaft 24 through coupler 64. Pinion 32 is secured to layshaft 24 and drives ring gear 34 and output 36.

A shift may be accomplished in reverse by progressively engaging clutch 20 while progressively releasing clutch 16. The power path for this speed comprises input 10, clutch 20, input shaft 14, pinion 52, gear 42, gear 58, coupler 64, layshaft 24, output pinion 32, output gear 34, and output 36. Following the shift, input 10 is driveably connected to shaft 14 and pinion 52 through clutch 20. Pinion 52 drives gear 42 and gear 58, which is driveably connected to shaft 24 through coupler 64. Pinion 32 is secured to shaft 24 and drives ring gear 34 and output 36.

A chart containing a preferred number of teeth for each of the gears of the transaxle of FIG. 1 is shown in FIG. 2, while FIG. 3 is a chart containing the speed ratios between the input and output and steps between the speed ratios for each of the forward and reverse speeds of the transaxle of FIG. 1.

Figure 4:
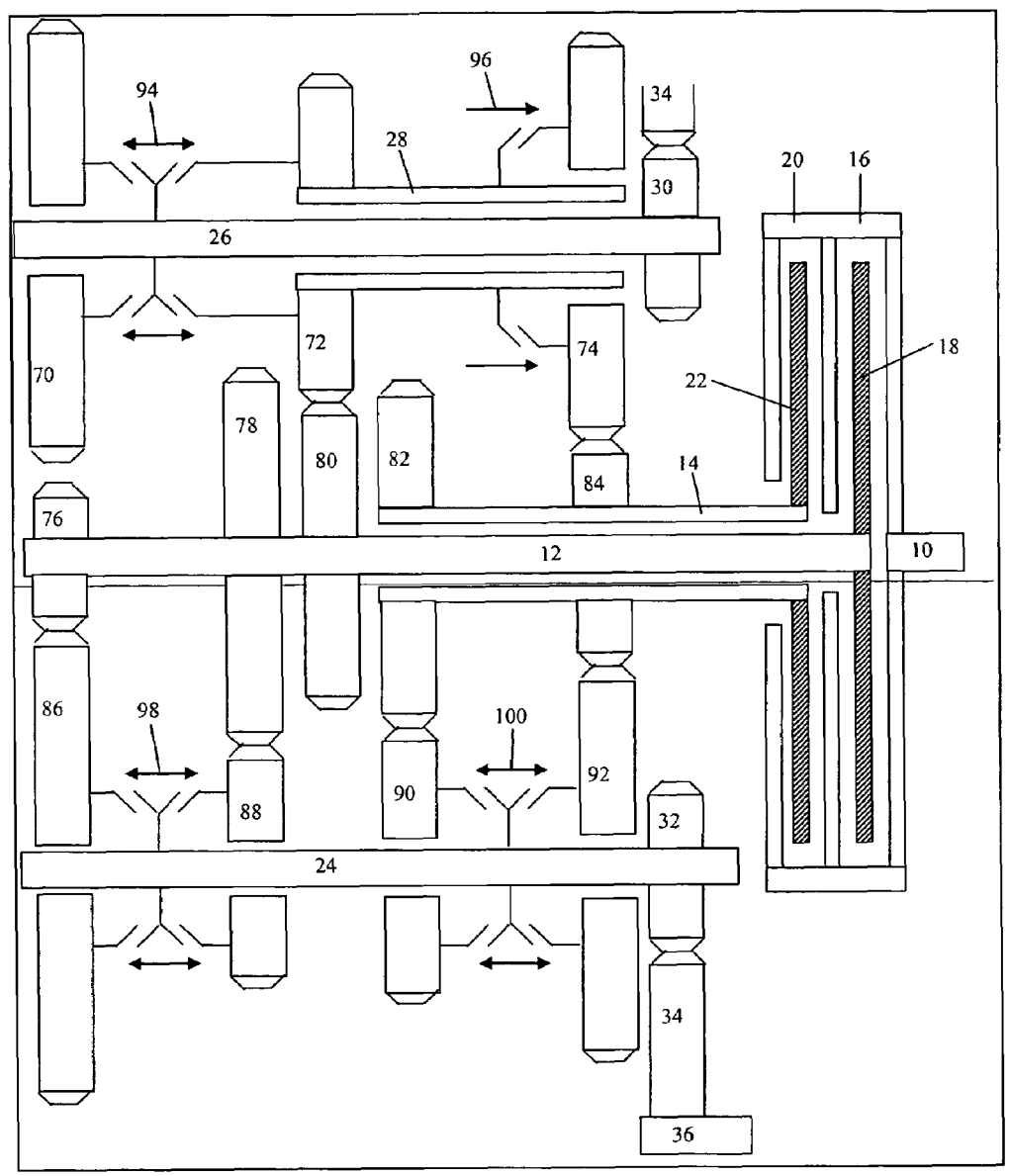
FIG. 4 is a schematic diagram showing of a seven forward speed, two reverse speed front wheel drive transaxle according to the present invention.

Referring now to FIG. 4, a transaxle according to the present invention includes an input 10 for driveably connecting a power source, such as an internal combustion engine or electric motor, to the transmission, and an output 36 for driving a load, such as the driven wheels of a motor vehicle, through a powertrain that may include a drive shaft, differential mechanism, and axle shafts. A first friction clutch 16, consisting of a clutch housing and a clutch disc 18, alternately connects and disconnects a first input shaft 12 as clutch 16 is engaged and disengaged, respectively. A second friction clutch 20, consisting of a clutch housing and a clutch disc 22, connects and disconnects a second input shaft 14 as clutch 20 is engaged and disengaged, respectively.

A first layshaft 26 supports a first output pinion 30, which is secured to layshaft 26 in continuous meshing engagement with an output ring gear 34, secured to output 36. A second layshaft 24 supports a second output pinion 32, which is secured to the layshaft in continuous meshing engagement with output ring gear 34.

The second input shaft 14 supports two pinions 82 and 84 which are secured to shaft 14. The first input shaft 12 supports three pinions 76, 78, and 80 which are secured to shaft 12. Gears 86, 88, 90, and 92 are supported on layshaft 24 for rotation relative to layshaft 24 and in continuous meshing engagement with pinions 76, 78, 82, and 84 respectively. Gear 70 is supported on layshaft 26 for rotation relative to layshaft 26, and in continuous meshing engagement with gear 86. Auxiliary shaft 28 is a hollow shaft supported on layshaft 26 for rotation relative to layshaft 26. Auxiliary shaft 28 supports gear 72 which is secured to shaft 28 and in continuous meshing engagement with pinion 80. Gear 74 is supported on shaft 28 for rotation relative to shaft 28 and in continuous meshing engagement with pinion 84.

Coupler 94 connects layshaft 26 to gear 70, gear 72, or disconnects it from both. Coupler 96 connects or disconnects auxiliary shaft 28 to gear 74. Coupler 98 connects layshaft 24 to gear 86, gear 88, or disconnects it from both. Coupler 100 connects layshaft 24 to gear 90, gear 92, or disconnects it from both.

Engaging coupler 96 to gear 74 activates a power path between the first and second input shaft comprising pinion 84, gear 74, coupler 96, auxiliary shaft 28, gear 72, and pinion 80.

To accelerate the vehicle using the first forward speed, the transmission is configured with coupler 96 engaging gear 74 and coupler 98 engaging gear 86. Then, clutch 20 is engaged. The power path for this speed comprises input 10, clutch 20, input shaft 14, pinion 84, gear 74, coupler 96, auxiliary shaft 28, gear 72, pinion 80, input shaft 12, pinion 76, gear 86, coupler 98, layshaft 24, output pinion 32, output gear 34, and output 36. Input 10 is driveably connected to shaft 14 and pinion 84 through clutch 20. Pinion 84 drives gear 74, which is driveably connected to auxiliary shaft 28 through coupler 96. Auxiliary shaft 28 drives gear 72, pinion 80, shaft 12, pinion 76, and gear 86. Gear 86 is driveably connected to layshaft 24 through coupler 98. Pinion 32 is secured to layshaft 24 and drives ring gear 34 and output 36.

To shift from the first forward speed to the second forward speed, clutch 16 is progressively engaged while clutch 20 is progressively released. Following the shift, coupler 96 may be moved to the neutral position. The power path for this speed comprises input 10, clutch 16, input shaft 12, pinion 76, gear 86, coupler 98, layshaft 24, output pinion 32, output gear 34, and output 36. Input 10 is driveably connected to shaft 12 and pinion 76 through clutch 16. Pinion 76 drives gear 86, which is driveably connected to shaft 24 through coupler 98. Pinion 32 is secured to shaft 24 and drives ring gear 34 and output 36.

To shift from the second forward speed to the third forward speed, the transmission is configured by displacing coupler 100 to engage gear 92, then clutch 20 is progressively engaged while clutch 16 is progressively released. Following the shift, coupler 98 may be moved to the neutral position. The power path for this speed comprises input 10, clutch 20, input shaft 14, pinion 84, gear 92, coupler 100, layshaft 24, output pinion 32, output gear 34, and output 36. Input 10 is driveably connected to shaft 14 and pinion 84 through clutch 20. Pinion 84 drives gear 92, which is driveably connected to shaft 24 through coupler 100. Pinion 32 is secured to shaft 24 and drives ring gear 34 and output 36.

To shift from the third forward speed to the fourth forward speed, the transmission is configured by displacing coupler 94 to engage gear 72, then clutch 16 is progressively engaged while clutch 20 is progressively released. Following the shift, coupler 100 may be moved to the neutral position. The power path for this speed comprises input 10, clutch 16, input shaft 12, pinion 80, gear 72, coupler 94, layshaft 26, output pinion 30, output gear 34, and output 36. Input 10 is driveably connected to shaft 12 and pinion 80 through clutch 16. Pinion 80 drives gear 72, which is driveably connected to shaft 26 through coupler 94. Pinion 30 is secured to shaft 26 and drives ring gear 34 and output 36.

To shift from the fourth forward speed to the fifth forward speed, the transmission is configured by displacing coupler 100 to engage gear 90, then clutch 20 is progressively engaged while clutch 16 is progressively released. Following the shift, coupler 94 may be moved to the neutral position. The power path for this speed comprises input 10, clutch 20, input shaft 14, pinion 82, gear 90, coupler 100, layshaft 24, output pinion 32, output gear 34, and output 36. Input 10 is driveably connected to shaft 14 and pinion 82 through clutch 20. Pinion 82 drives gear 90, which is driveably connected to shaft 24 through coupler 100. Pinion 32 is secured to shaft 24 and drives ring gear 34 and output 36.

To shift from the fifth forward speed to the sixth forward speed, the transmission is configured by displacing coupler 98 to engage gear 88, then clutch 16 is progressively engaged while clutch 20 is progressively released. Following the shift, coupler 100 may be moved to the neutral position. The power path for this speed comprises input 10, clutch 16, input shaft 12, pinion 78, gear 88, coupler 98, layshaft 24, output pinion 32, output gear 34, and output 36. Input 10 is driveably connected to shaft 12 and pinion 78 through clutch 16. Pinion 78 drives gear 88, which is driveably connected to shaft 24 through coupler 98. Pinion 32 is secured to shaft 24 and drives ring gear 34 and output 36.

An upshift from the sixth forward speed to the seventh forward speed, unlike all other single step shifts, requires a torque break, i.e., the torsional connection between the input 10 and output 36 is briefly interrupted by disengaging clutch 16 while the state of the couplers are changed. This is mitigated because the 6-7 upshift is never made at high throttle; instead, it usually occurs as a result of the driver reducing power demand when reaching cruising speed. While both clutches are disengaged, coupler 98 is moved to the neutral position, coupler 96 is displaced to engage gear 74, and coupler 100 is displaced to engage gear 90. Then, clutch 16 is re-engaged. The power path for this speed comprises input 10, clutch 16, input shaft 12, pinion 80, gear 72, auxiliary shaft 28, coupler 96, gear 74, pinion 84, input shaft 14, pinion 82, gear 90, coupler 100, layshaft 24, output pinion 32, output gear 34, and output 36. When clutch 16 is re-engaged, input 10 is driveably connected to shaft 12 and pinion 80 through clutch 16. Pinion 80 drives gear 72 and auxiliary shaft 28, which is driveably connected to gear 74 through coupler 96. Gear 74 drives pinion 84, shaft 14, pinion 82, and gear 90, which is driveably connected to shaft 24 through coupler 100. Pinion 32 is secured to shaft 24 and drives ring gear 34 and output 36.

Downshifts are accomplished by reversing the steps of the corresponding upshift.

To accelerate the vehicle in reverse, the transmission is configured with coupler 96 engaging gear 74 and coupler 94 engaging gear 70. Then, clutch 20 is engaged. The power path for this speed comprises input 10, clutch 20, input shaft 14, pinion 84, gear 74, coupler 96, auxiliary shaft 28, gear 72, pinion 80, input shaft 12, pinion 76, gear 86, gear 70, coupler 94, layshaft 26, output pinion 30, output gear 34, and output 36. Input 10 is driveably connected to shaft 14 and pinion 84 through clutch 20. Pinion 84 drives gear 74, which is driveably connected to auxiliary shaft 28 through coupler 96. Auxiliary shaft 28 drives gear 72, pinion 80, shaft 12, pinion 76, gear 86, and gear 70. Gear 70 is driveably connected to layshaft 26 through coupler 94. Pinion 30 is secured to layshaft 26 and drives ring gear 34 and output 36.

A shift may be accomplished in reverse by progressively engaging clutch 16 while progressively releasing clutch 20. The power path for this speed comprises input 10, clutch 16, input shaft 12, pinion 76, gear 86, gear 70, coupler 94, layshaft 26, output pinion 30, output gear 34, and output 36. Following the shift, input 10 is driveably connected to shaft 12 and pinion 76 through clutch 16. Pinion 76 drives gear 86 and gear 70, which is driveably connected to shaft 26 through coupler 94. Pinion 30 is secured to shaft 26 and drives ring gear 34 and output 36.

A chart containing a preferred number of teeth for each of the gears of the transaxle of FIG. 4 is shown in FIG. 5, while FIG. 6 is a chart containing the speed ratios between the input and output and steps between the speed ratios for each of the forward and reverse speeds of the transaxle of FIG. 4, the gears having the number of teeth shown in FIG. 5.

Figure 7:
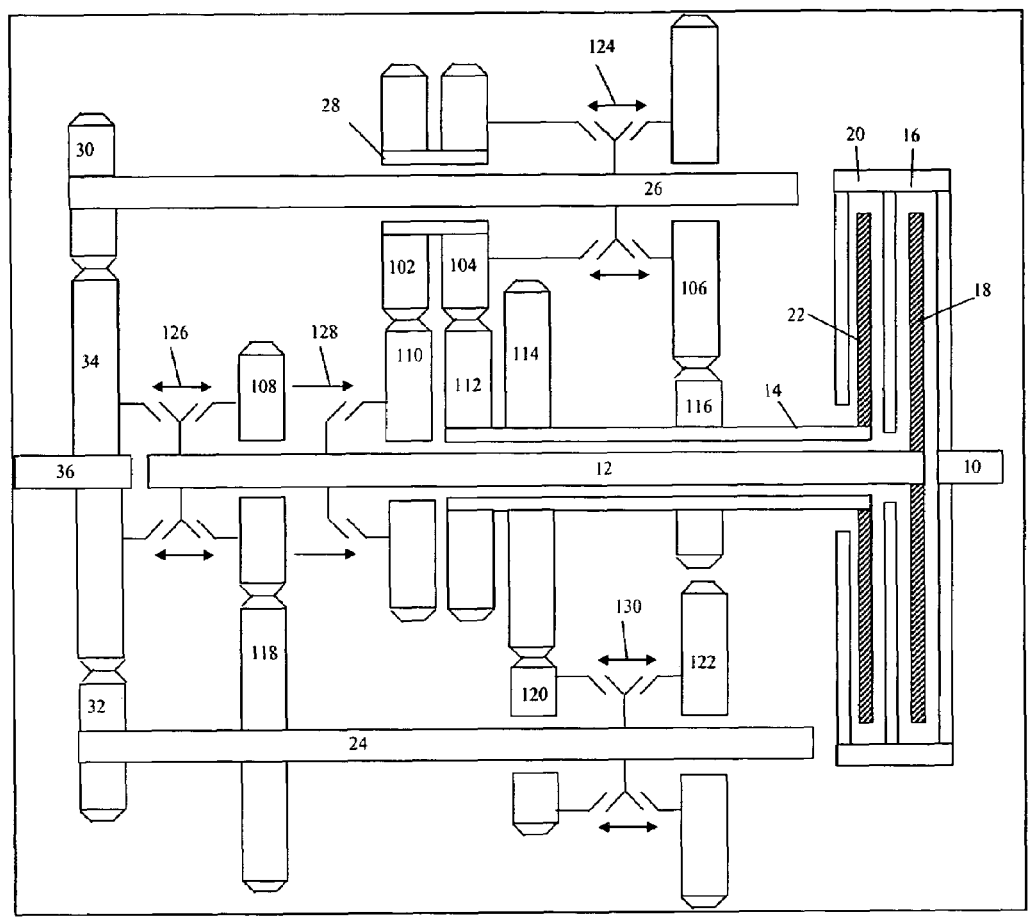
FIG. 7 is a schematic diagram showing of a seven forward speed, two reverse speed rear wheel drive transmission according to the present invention.

Referring to FIG. 7, a rear wheel drive transmission according to the present invention includes an input 10 for driveably connecting a power source, such as an internal combustion engine or electric motor, to the transmission, and an output 36, which is coaxial with input 10, for driving a load, such as the driven wheels of a motor vehicle, through a powertrain that may include a drive shaft, differential mechanism, and axle shafts. A first friction clutch 20, consisting of a clutch housing and a clutch disc 22, alternately connects and disconnects a first input shaft 14 as clutch 20 is engaged and disengaged, respectively. A second friction clutch 16, consisting of a clutch housing and a clutch disc 18, connects and disconnects a second input shaft 12 as clutch 16 is engaged and disengaged, respectively.

A first layshaft 26 supports a first output pinion 30, which is secured to layshaft 26 in continuous meshing engagement with an output gear 34, secured to output 36. A second layshaft 24 supports a second output pinion 32, which is secured to the layshaft in continuous meshing engagement with output gear 34.

The first input shaft 14 supports three pinions 112, 114, and 116 which are secured to shaft 14. The second input shaft 12 supports two pinions 108 and 110 which may rotate about shaft 12. Gear 106 is supported on layshaft 26 for rotation relative to layshaft 26, and in continuous meshing engagement with pinion 116. Auxiliary shaft 28 is a hollow shaft supported on layshaft 26 for rotation relative to layshaft 26. The auxiliary shaft 28 supports gears 102 and 104 which are secured to shaft 28 and in continuous meshing engagement with pinions 110 and 112 respectively. Gear 118 is secured to layshaft 24 and in continuous meshing engagement with pinion 108. Gears 120 and 122 are supported on layshaft 24 for rotation relative to layshaft 24 and in continuous meshing engagement with pinion 114 and gear 106, respectively.

Coupler 124 connects layshaft 26 to gear 104, gear 106, or disconnects it from both. Coupler 126 connects input shaft 12 to output gear 34, pinion 108, or disconnects it from both. Coupler 128 connects or disconnects shaft 12 to pinion 110. Coupler 130 connects layshaft 24 to gear 120, gear 122, or disconnects it from both.

Engaging coupler 128 to pinion 110 activates a power path between the first and second input shaft comprising pinion 112, gear 104, auxiliary shaft 28, gear 102, pinion 110, and coupler 128.

To accelerate the vehicle using the first forward speed, the transmission is configured with coupler 128 engaging pinion 110 and coupler 124 engaging gear 106. Then, clutch 16 is engaged. The power path for this speed comprises input 10, clutch 16, input shaft 12, coupler 128, pinion 110, gear 102, gear 104, pinion 112, input shaft 14, pinion 116, gear 106, coupler 124, layshaft 26, output pinion 30, output gear 34, and output 36. Input 10 is driveably connected to shaft 12 through clutch 16. Shaft 12 is driveably connected to pinion 110 through coupler 128. Pinion 110 drives gear 102, auxiliary shaft 28, gear 104, pinion 112, shaft 14, pinion 116, and gear 106. Gear 106 is driveably connected to layshaft 26 through coupler 124. Pinion 30 is secured to layshaft 26 and drives output gear 34 and output 36.

To shift from the first forward speed to the second forward speed, clutch 20 is progressively engaged while clutch 16 is progressively released. Following the shift, coupler 128 may be moved to the neutral position. The power path for this speed comprises input 10, clutch 20, input shaft 14, pinion 116, gear 106, coupler 124, layshaft 26, output pinion 30, output gear 34, and output 36. Input 10 is driveably connected to shaft 14 and pinion 116 through clutch 20. Pinion 116 drives gear 106, which is driveably connected to shaft 26 through coupler 124. Pinion 30 is secured to shaft 26 and drives output gear 34 and output 36.

To shift from the second forward speed to the third forward speed, the transmission is configured by displacing coupler 126 to engage gear 108, then clutch 16 is progressively engaged while clutch 20 is progressively released. Following the shift, coupler 124 may be moved to the neutral position. The power path for this speed comprises input 10, clutch 16, input shaft 12, coupler 126, pinion 108, gear 118, layshaft 24, output pinion 32, output gear 34, and output 36. Input 10 is driveably connected to shaft 12 through clutch 16. Shaft 12 is driveably connected to pinion 108 through coupler 126. Pinion 108 drives gear 118, shaft 24, pinion 32, output gear 34, and output 36.

To shift from the third forward speed to the fourth forward speed, the transmission is configured by displacing coupler 130 to engage gear 120, then clutch 20 is progressively engaged while clutch 16 is progressively released. Following the shift, coupler 126 may be moved to the neutral position. The power path for this speed comprises input 10, clutch 20, input shaft 14, pinion 114, gear 120, coupler 130, layshaft 24, output pinion 32, output gear 34, and output 36. Input 10 is driveably connected to shaft 14 and pinion 114 through clutch 20. Pinion 114 drives gear 120, which is driveably connected to shaft 24 through coupler 130. Pinion 32 is secured to shaft 24 and drives output gear 34 and output 36.

To shift from the fourth forward speed to the fifth forward speed, the transmission is configured by displacing coupler 126 to engage output gear 34, then clutch 16 is progressively engaged while clutch 20 is progressively released. Following the shift, coupler 130 may be moved to the neutral position. The power path for this speed comprises input 10, clutch 16, input shaft 12, coupler 126, output gear 34, and output 36. Input 10 is driveably connected to shaft 12 through clutch 16. Shaft 12 is driveably connected to output gear 34 and output 36 through coupler 126. The fifth forward speed is direct drive.

To shift from the fifth forward speed to the sixth forward speed, the transmission is configured by displacing coupler 124 to engage gear 104, then clutch 20 is progressively engaged while clutch 16 is progressively released. Following the shift, coupler 126 may be moved to the neutral position. The power path for this speed comprises input 10, clutch 20, input shaft 14, pinion 112, gear 104, coupler 124, layshaft 26, output pinion 30, output gear 34, and output 36. Input 10 is driveably connected to shaft 14 and pinion 112 through clutch 20. Pinion 112 drives gear 104, which is driveably connected to shaft 26 through coupler 124. Pinion 30 is secured to shaft 26 and drives output gear 34 and output 36.

An upshift from the sixth forward speed to the seventh forward speed, unlike all other single step shifts, requires a torque break, i.e., the torsional connection between the input 10 and output 36 is briefly interrupted by disengaging clutch 20 while the state of the couplers are changed. This is mitigated because the 6-7 upshift is never made at high throttle; instead, it usually occurs as a result of the driver reducing power demand when reaching cruising speed. While both clutches are disengaged, coupler 124 is moved to the neutral position, coupler 128 is displaced to engage pinion 110, and coupler 126 is displaced to engage output gear 34. Then clutch 20 is re-engaged. The power path for this speed comprises input 10, clutch 20, input shaft 14, pinion 112, gear 104, auxiliary shaft 28, gear 102, pinion 110, coupler 128, input shaft 12, coupler 126, output gear 34, and output 36. When clutch 20 is re-engaged, input 10 is driveably connected to shaft 14 and pinion 112 through clutch 20. Pinion 112 drives gear 104, auxiliary shaft 28, gear 102, and pinion 110. Pinion 110 is driveably connected to shaft 12 through coupler 128. Shaft 12 is driveably connected to output gear 34 and output 36 through coupler 126.

Downshifts are accomplished by reversing the steps of the corresponding upshift.

To accelerate the vehicle in reverse, the transmission is configured with coupler 128 engaging pinion 110 and coupler 130 engaging gear 122. Then, clutch 16 is engaged. The power path for this speed comprises input 10, clutch 16, input shaft 12, coupler 128, pinion 110, gear 102, gear 104, pinion 112, input shaft 14, pinion 116, gear 106, gear 122, coupler 130, layshaft 24, output pinion 32, output gear 34, and output 36. Input 10 is driveably connected to shaft 12 through clutch 16. Shaft 12 is driveably connected to pinion 110 through coupler 128. Pinion 110 drives gear 102, auxiliary shaft 28, gear 104, pinion 112, shaft 14, pinion 116, gear 106, and gear 122. Gear 122 is driveably connected to layshaft 24 through coupler 130. Pinion 32 is secured to layshaft 24 and drives output gear 34 and output 36.

A shift may be accomplished in reverse by progressively engaging clutch 20 while progressively releasing clutch 16. The power path for this speed comprises input 10, clutch 20, input shaft 14, pinion 116, gear 106, gear 122, coupler 130, layshaft 24, output pinion 32, output gear 34, and output 36. Following the shift, input 10 is driveably connected to shaft 14 and pinion 116 through clutch 20. Pinion 116 drives gear 106 and gear 122, which is driveably connected to shaft 24 through coupler 130. Pinion 32 is secured to shaft 24 and drives ring gear 34 and output 36.

For purposes of this description of the invention and the claims, use of the words "driveably connected", "driving engagement", or derivatives of such is meant to include either a direct drive relationship between interacting components, or an indirect drive relationship between identified components that have other components therebetween, including but not limited to gears, pinions, shafts, couplers and clutches. As seen in FIGS. 1, 4 and 7, the layshafts 24, 26, and auxiliary shaft 28, are non-coaxial with the input shafts 12, 14.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A multiple speed power transmission, comprising:
   an input;
   first and second input shafts;
   first and second clutches releasably coupling the input to the first and second input shafts, respectively; an output; and
   a power path connecting the input to the output, wherein: said power path includes both the first and second input shafts;
   the second input shaft rotates at a slower speed than the first input shaft; and
   the portion of said power path between the first and second input shafts is engaged by actuating a single coupler.

2. The transmission of claim 1 wherein the first and second input shafts are substantially co-axial.

3. The transmission of claim 1 wherein a power flow of the power path that includes both the first and second input shafts passes from one of the first and second input shafts to a first non-input shaft that is non-coaxial with the first and second input shafts, to the other of the first and second inputs shafts.

4. The transmission of claim 3, wherein a power flow of the power path that includes both the first and second input shafts passes from one of the first and second input shafts through a coupler mounted thereon and selectively engageable with a first pinion supported for rotation on the one of the first and second input shafts and in continuous meshing engagement with a first gear mounted on the first non-input shaft, to a second gear mounted on the first non-input shaft in continuous meshing engagement with a second pinion mounted to the other of the first and second input shafts.

5. The transmission of claim 4 wherein a power flow of a forward speed power path that includes both the first and second input shafts passes from the other of the first and second input shafts to a third pinion mounted thereto in meshing engagement with a third gear driveably connected to a second non-input shaft, the second non-input shaft in driving engagement with the output.

6. The transmission of claim 5 wherein the first and second non-input shafts are substantially co-axial.

7. The transmission of claim 5 wherein a power flow of a reverse speed power path that includes both the first and second input shafts passes from the other of the first and second input shafts to the third pinion mounted thereto in meshing engagement with a fourth gear, the fourth gear in meshing engagement with a fifth gear driveably connected to a third non-input shaft, the third non-input shaft in driving engagement with the output.

8. The transmission of claim 3, wherein a power flow of the power path that includes both the first and second input shafts passes from one of the first and second input shafts to a first pinion mounted thereon and in continuous meshing engagement with a first gear supported for rotation about the first non-input shaft, to a coupler mounted on the first non-input shaft and selectively driveably connected to the first gear, to a second gear mounted on the first non-input shaft in continuous meshing engagement with a second pinion mounted to the other of the first and second input shafts.

9. The transmission of claim 8 wherein a power flow of the power path that includes both the first and second input shafts passes from the other of the first and second input shafts to a third pinion mounted thereto in meshing engagement with a third gear driveably connected to a second non-input shaft, the second non-input shaft in driving engagement with the output.

10. The transmission of claim 9 wherein a power flow of a reverse speed power path that includes both the first and second input shafts passes from the other of the first and second input shafts to the third pinion mounted thereto in meshing engagement with a fourth gear, the fourth gear in meshing engagement with a fifth gear driveably connected to a third non-input shaft, the third non-input shaft in driving engagement with the output.

11. The transmission of claim 10 wherein the first and third non-input shafts are substantially co-axial.

12. The transmission of claim 1 wherein the power path that includes both the first and second input shafts further includes one of the first and second input shafts selectively driveably engaged directly to the output.

13. A multiple speed power transmission, comprising:
    an input;
    an output;
    first and second input shafts;
    first and second clutches releasably coupling the input to the first and second input shafts, respectively;
    a first pinion secured to the first input shaft;
    a first gear secured to an auxiliary shaft and in continuous meshing engagement with the first pinion;
    a second pinion secured to the auxiliary shaft;
    a second gear, supported for rotation about the second input shaft and in continuous meshing engagement with the second pinion;
    a first coupler for releasably coupling the second gear to the second input shaft;
    a first set of selectable power paths connecting the first input shaft to the output; and
    a second set of selectable power paths connecting the second input shaft to the output.

14. The transmission of claim 13, further comprising:
    an output gear secured to the output;
    a first layshaft;
    a third pinion secured to the first layshaft and in continuous meshing engagement with the output gear;
    a second layshaft; and a fourth pinion secured to the second layshaft and in continuous meshing engagement with the output gear.

15. The transmission of claim 14, wherein the first set of selectable power paths comprises:
a first even pinion secured to the first input shaft;
a first even gear, supported for rotation about the first layshaft and in continuous meshing engagement with the first even pinion;
a second coupler for alternately releasably coupling the first gear and the first even gear to the first layshaft;
a second even gear, supported for rotation about the second layshaft and in continuous meshing engagement with the first even gear; and
a third coupler for releasably coupling the second even gear to the second layshaft.

16. The transmission of claim 15, wherein the second set of selectable power paths comprises:
a first odd pinion secured to the second input shaft;
a first odd gear, supported for rotation about the second layshaft and in continuous meshing engagement with the first odd pinion;
the third coupler for alternately releasably coupling the first odd gear and the second even gear to the second layshaft;
a second odd pinion, supported for rotation about the second input shaft;
a second odd gear secured to the second layshaft and in continuous meshing engagement with the second odd pinion; and
the first coupler for releasably coupling the second odd pinion and the second gear to the second input shaft.

17. The transmission of claim 14, wherein one power path of the first set of selectable power paths comprises:
the first input shaft;
a first even pinion secured to the first input shaft;
a first even gear, supported for rotation about the first layshaft and in continuous meshing engagement with the first even pinion;
a second coupler for alternately releasably coupling the first even gear to the first layshaft;
the first layshaft;
the third pinion;
the output gear; and
the output.

18. The transmission of claim 17, wherein one power path of the first set of selectable power paths comprises:
the first input shaft;
the first pinion;
the first gear;
the second coupler for alternately releasably coupling the first gear and the first even gear to the first layshaft;
the first layshaft;
the third pinion;
the output gear; and
the output.

19. A multiple speed power transmission, comprising:
an input;
substantially coaxial first and second input shafts;
first and second clutches releasably coupling the input to the first and second input shafts, respectively;
an auxiliary shaft, not coaxial with the first input shaft, driveably connected to the first input shaft;
a first gear, supported for rotation about the auxiliary shaft and driveably connected to the second input shaft;
a first coupler for releasably coupling the first gear to the auxiliary shaft;
an output;
a first set of selectable power paths connecting the first input shaft to the output;
a second set of selectable power paths connecting the second input shaft to the output;
a first pinion secured to the second input shaft and in continuous meshing engagement with the first gear;
a second pinion secured to the first input shaft;
a second gear secured to the auxiliary shaft and in continuous meshing engagement with the second pinion;
an output gear secured to the output;
a first layshaft;
a third pinion secured to the first layshaft and in continuous meshing engagement with the output gear;
a second layshaft; and
a fourth pinion secured to the second layshaft and in continuous meshing engagement with the output gear.

20. The transmission of claim 19, wherein the second set of selectable power paths comprises:
a third gear supported for rotation about the second layshaft and in continuous meshing engagement with the first pinion;
a fifth pinion secured to the second input shaft;
a fourth gear, supported for rotation about the second layshaft and in continuous meshing engagement with the fifth pinion; and
a second coupler for alternately releasably coupling the third gear and the fourth gear to the second layshaft.

21. The transmission of claim 19, wherein the auxiliary shaft is coaxial with the first layshaft.

22. The transmission of claim 21, wherein the first set of selectable power paths comprises:
a sixth pinion secured to the first input shaft;
a fifth gear, supported for rotation about the second layshaft and in continuous meshing engagement with the sixth pinion;
a sixth gear, supported for rotation about the first layshaft and in continuous meshing engagement with the fifth gear;
a seventh pinion secured to the first input shaft;
a seventh gear, supported for rotation about the second layshaft and in continuous meshing engagement with the seventh pinion;
a third coupler for alternately releasably coupling the second gear and the sixth gear to the first layshaft; and
a fourth coupler for releasably coupling the fifth gear and the seventh gear to the second layshaft.

23. A multiple speed power transmission, comprising:
an input;
an output;
substantially coaxial first and second input shafts;
first and second clutches releasably coupling the input to the first and second input shafts, respectively;
an auxiliary shaft driveably connected to the first input shaft without a coupler; and
a coupler for releasably driveably connecting the second input shaft to the auxiliary shaft.

24. The transmission of claim 23 further comprising a first power path from the first input shaft to the output, said power path not including the auxiliary shaft.

25. The transmission of claim 24 further comprising a second power path from the second input shaft to the output, said power path not including the auxiliary shaft.

26. A multiple speed power transmission, comprising:
an input;
substantially coaxial first and second input shafts;

first and second clutches releasably coupling the input to the first and second input shafts, respectively;

a first selectable power path connecting the first and second input shafts, wherein power passes from the first input shaft to an auxiliary shaft that is non-coaxial with the first and second input shafts, to the second input shaft;

an output;

a second selectable power path connecting the first input shaft to the output, said second selectable power path not including the auxiliary shaft; and a third selectable power path connecting the second input shaft to the output, said third selectable power path not including the auxiliary shaft.

27. The transmission of claim 26 wherein the first selectable power path comprises:

a first pinion secured to the first input shaft;

a first gear secured to the auxiliary shaft and in continuous meshing engagement with the first pinion;

a second pinion secured to the second input shaft;

a second gear, supported for rotation on the auxiliary shaft and in continuous meshing engagement with the second pinion; and a coupler for releasably coupling the second gear to the auxiliary shaft.

28. The transmission of claim 26 wherein the first selectable power path comprises:

a first pinion secured to the first input shaft;

a first gear secured to the auxiliary shaft and in continuous meshing engagement with the first pinion;

a second pinion secured to the auxiliary shaft;

a second gear, supported for rotation on the second input shaft and in continuous meshing engagement with the second pinion; and a coupler for releasably coupling the second gear to the second input shaft.

* * * * *